United States Patent
Aoyagi

(10) Patent No.: US 10,927,823 B2
(45) Date of Patent: Feb. 23, 2021

(54) POWER GENERATION MECHANISM AND METHOD FOR GENERATING POWER

(71) Applicant: ADAMANT NAMIKI PRECISION JEWEL CO., LTD., Tokyo (JP)

(72) Inventor: Tomohide Aoyagi, Tokyo (JP)

(73) Assignee: Adamant Namiki Precision Jewel Co., Ltd., Tokyo (JP)

( * ) Notice: Subject to any disclaimer, the term of this patent is extended or adjusted under 35 U.S.C. 154(b) by 0 days.

(21) Appl. No.: 16/582,395

(22) Filed: Sep. 25, 2019

(65) Prior Publication Data

US 2020/0018295 A1 Jan. 16, 2020

Related U.S. Application Data

(63) Continuation of application No. PCT/JP2018/012475, filed on Mar. 27, 2018.

(30) Foreign Application Priority Data

Mar. 29, 2017 (JP) .................................. 2017-065011

(51) Int. Cl.
*F03G 1/00* (2006.01)
*F03G 1/06* (2006.01)
(Continued)

(52) U.S. Cl.
CPC .................. *F03G 1/06* (2013.01); *F03G 1/02* (2013.01); *F03G 1/08* (2013.01); *F03G 5/06* (2013.01); *H02K 7/116* (2013.01); *H02K 7/18* (2013.01)

(58) Field of Classification Search
CPC ................ F03G 1/02; F03G 1/08; H02K 7/18
See application file for complete search history.

(56) References Cited

U.S. PATENT DOCUMENTS 9,273,504 B2 * 3/2016 Schutt ...................... F03G 1/08
2017/0328353 A1 * 11/2017 Polanich ................... F03G 1/02

FOREIGN PATENT DOCUMENTS

DE 10 2013 210 650 A1 12/2014
WO WO-2005042972 A2 * 5/2005 ............... F03G 1/02
(Continued)

OTHER PUBLICATIONS

International Search Report issued in PCT/JP2018/012475; dated Jun. 19, 2018.
(Continued)

*Primary Examiner* — Phillip A Johnson
(74) *Attorney, Agent, or Firm* — Studebaker & Brackett PC

(57) ABSTRACT

A power generation mechanism includes a first movable member, a second movable member, a twisted coil spring, a power generator, and a housing. The first and second movable members are gears. First and second wound parts of the spring are wound around a first center shaft in opposite directions. Initial elastic energies ie1 and ie2 are respectively applied to the first and second wound parts, absolute values of ie2 and ie1 being equal. The second movable member is turnable by a force from outside the mechanism, engaging teeth of the first and second movable members together to turn the first movable member. With ie12 accumulating on the first wound part and with the teeth disengaged from each other, the first center shaft is turned in an opposite direction by ie12 to generate power in the power generator. Also, the first center shaft is turned by ie1 and ie2.

8 Claims, 13 Drawing Sheets

(51) Int. Cl.
*F03G 1/02* (2006.01)
*F03G 5/06* (2006.01)
*H02K 7/116* (2006.01)
*H02K 7/18* (2006.01)
*F03G 1/08* (2006.01)

(56) References Cited

FOREIGN PATENT DOCUMENTS

| WO | 2013/027161 A2 | 2/2013 |
| WO | 2013/085057 A1 | 6/2013 |
| WO | 2013/093715 A1 | 6/2013 |

OTHER PUBLICATIONS

EnOcean; "Energy Harvesting"; accessed Feb. 9, 2016; pp. 1-4; https://www.enocean.com/jp/technology/energy-harvesting/.

The extended European search report issued by the European Patent Office dated Dec. 10, 2020, which corresponds to European Patent Application No. 18774328.1-1004 and is related to U.S. Appl. No. 16/582,395.

* cited by examiner

POWER GENERATION MECHANISM AND METHOD FOR GENERATING POWER

CROSS-REFERENCE TO RELATED APPLICATIONS

The present application is a continuation application of International Application No. PCT/JP2018/012475, filed Mar. 27, 2018, which claims priority to Japanese Patent Application No. 2017-065011, filed Mar. 29, 2017. The contents of these applications are incorporated herein by reference in their entirety.

BACKGROUND OF THE INVENTION

Field of the Invention

The present invention relates to a power generation mechanism and a method for generating power.

Discussion of the Background

Recently, self-powered energy harvesters have been in focus of attention. Self-powered energy harvesters are capable of generating power using very small amounts of kinetic energy (such as human power, vibration, pressure, heat, and sunlight) that have been conventionally unused and disposed of in everyday environments.

Some electrical appliances, including some lighting devices, are controllable by remote control using wireless communication devices. This kind of wireless communication device is controlled by a wireless switch equipped with a power source such as a dry cell. Using power supplied from the power source, the wireless switch controls the wireless communication device.

At the same time, there is a need for a switch power generation mechanism that generates power by energy harvesting and uses the power to send operation instructions wirelessly to various devices and machines so that there is no need for replacement, charging, and other work associated with a power source. Specifically, there exists a self-powered power generation mechanism that, instead of relying on a power source, generates power based on a switching operation that a user performs when the user sends an instruction wirelessly to an appliance such as a lighting device so as to turn on or off the lighting device.

For example, a power generation mechanism is recited in "Energy Harvesting" (https://www.enocean.com/jp/technology/energy-harvesting/, (accessed Feb. 9, 2016)). The power generation mechanism generates power based on kinetic energy generated by a switch-pressing operation (switching operation), and sends an instruction wirelessly to a lighting device so as to turn on or off the lighting device.

An example power generation mechanism has such a configuration that includes a magnet and a voice coil that is fixed to the power generation mechanism, with the magnet connected to a switch part. Upon pressing of the switch part by a user, the magnet moves through the voice coil, generating kinetic energy, and power is generated from the kinetic energy. Thus, the amount of power generated is largely dependent on the speed of the magnet moving through the voice coil, that is, the speed at which the switch part is pressed.

Specifically, power generation voltage is proportional to the speed at which a flux in the voice coil changes based on the movement of the magnet. Also, power is represented by "(power W)=(voltage $V^2$)/(resistance R of the voice coil)".

Under the circumstances, if the movement speed of the magnet through the voice coil (or the movement speed of the voice coil through the magnet) is too low, the power generation voltage is also too low to generate a sufficient amount of power.

Further, the speed at which the switch is pressed varies from user to user, causing the amount of power generation to vary accordingly. In some situations, this has resulted in a shortage of amount of power.

SUMMARY OF THE INVENTION

According to one aspect of the present invention, a power generation mechanism includes a first movable member, a second movable member, a twisted coil spring, a power generator, and a housing. The first movable member is supported by a first center shaft rotatably about the first center shaft. The first movable member includes a first gear that includes a first transmission core and a first tooth formed on a part of the first transmission core. The second movable member is supported by a second center shaft rotatably about the second center shaft. The second movable member includes a second gear that includes a second transmission core and a second tooth formed on a part of the second transmission core. The twisted coil spring includes a first wound part wound and a second wound part wound. The first wound part is wound around the first center shaft. One end of the first wound part is a free end, and another end of the first wound part is connected to at least one of the first movable member, the first center shaft, and the second wound part. The first wound part is twisted with initial elastic energy ie1 applied to the first wound part as measured without any force transmitted from outside the power generation mechanism. The second wound part is wound around the first center shaft in a direction opposite to a direction in which the first wound part is wound. One end of the second wound part is a free end, and another end of the second wound part is connected to at least one of the first movable member, the first center shaft, and the first wound part. The second wound part is twisted with initial elastic energy ie2 applied to the second wound part as measured without any force transmitted from outside the power generation mechanism. An absolute value of the initial elastic energy ie2 is equal to an absolute value of the initial elastic energy ie1. The second movable member is turnable by a predetermined amount by a force transmitted to the second movable member from outside the power generation mechanism through the second center shaft, bringing the first tooth of the first movable member and the second tooth of the second movable member into engagement with each other to make the first movable member and the second movable member movable together so that the first movable member is turned by the predetermined amount. Upon turning of the first movable member by the predetermined amount, the free end of the first wound part contacts the housing and is prevented from moving, making the first wound part twisted with elastic energy ie12 accumulating on the first wound part. After the first movable member has been turned by the predetermined amount, the first tooth of the first movable member and the second tooth of the second movable member are disengaged from each other, and the first movable member is turned in an opposite direction by the predetermined amount by the elastic energy ie12, causing the first center shaft to turn so that turning of the first center shaft is transmitted to a shaft of the power generator, causing the shaft of the power generator to turn so that the power generator generates power. Upon turning of the first center shaft, the free end of the second wound part contacts the housing and is prevented from moving, causing the initial elastic energy ie1 and the initial elastic energy ie2 to turn the first center shaft.

According to another aspect of the present invention, a method for generating power uses a power generation mechanism. The power generation mechanism includes a first movable member, a second movable member, a twisted coil spring, a power generator, and a housing. The first movable member is supported by a first center shaft rotatably about the first center shaft. The first movable member includes a first gear that includes a first transmission core and a first tooth formed on a part of the first transmission core. The second movable member is supported by a second center shaft rotatably about the second center shaft. The second movable member includes a second gear that includes a second transmission core and a second tooth formed on a part of the second transmission core. The twisted coil spring includes a first wound part wound and a second wound part wound. The first wound part is wound around the first center shaft. One end of the first wound part is a free end, and another end of the first wound part is connected to at least one of the first movable member, the first center shaft, and the second wound part. The first wound part is twisted with initial elastic energy ie1 applied to the first wound part as measured without any force transmitted from outside the power generation mechanism. The second wound part is wound around the first center shaft in a direction opposite to a direction in which the first wound part is wound. One end of the second wound part is a free end, and another end of the second wound part is connected to at least one of the first movable member, the first center shaft, and the first wound part. The second wound part is twisted with initial elastic energy ie2 applied to the second wound part as measured without any force transmitted from outside the power generation mechanism. An absolute value of the initial elastic energy ie2 is equal to an absolute value of the initial elastic energy ie1. The method includes turning the second movable member by a predetermined amount by applying a force to the second movable member from outside the power generation mechanism through the second center shaft so as to bring the first tooth of the first movable member and the second tooth of the second movable member into engagement with each other, making the first movable member and the second movable member move together to turn the first movable member by the predetermined amount. By thus turning the first movable member by the predetermined amount, the free end of the first wound part is made to contact the housing and is prevented from moving so as to make the first wound part twisted with elastic energy ie12 accumulating on the first wound part. After the first movable member has been turned by the predetermined amount, the first tooth of the first movable member and the second tooth of the second movable member are disengaged from each other to cause the elastic energy ie12 to turn the first movable member in an opposite direction by the predetermined amount so as to cause the first center shaft to turn so that turning of the first center shaft is transmitted to a shaft of the power generator, causing the shaft of the power generator to turn so that the power generator generates power. By thus turning the first center shaft, the free end of the second wound part is made to contact the housing and is prevented from moving so as to cause the initial elastic energy ie1 and the initial elastic energy ie2 to turn the first center shaft.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
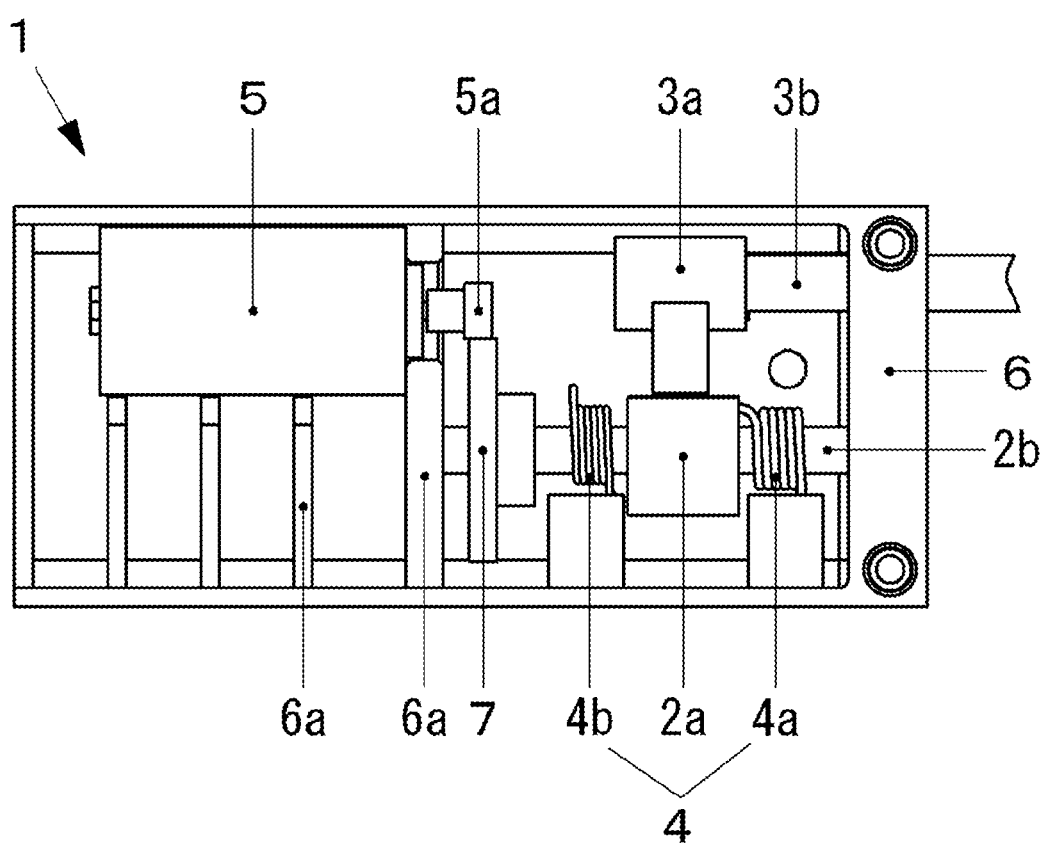
FIG. 1 is a plan view of a power generation mechanism according to an embodiment of the present invention, illustrating a configuration of the power generation mechanism.

An embodiment of the present invention is a power generation mechanism that generates power by a switching operation without using a power source. The power generation mechanism includes a first movable member, a second movable member, a twisted coil spring, a power generator, and a housing. The first movable member is a gear including a transmission core and a tooth formed on a part of the transmission core, and is supported rotatably about a first center shaft. The second movable member is a gear including a transmission core and a tooth formed on a part of the transmission core, and is supported rotatably about a second center shaft. The twisted coil spring includes a first wound part and a second wound part. The first wound part is wound around the first center shaft. One end of the first wound part is a free end, and another end of the first wound part is connected to at least one of the first movable member, the first center shaft, and the second wound part. The first wound part is twisted with initial elastic energy ie1 applied to the first wound part as measured without any force transmitted from outside the power generation mechanism. The second wound part is wound around the first center shaft in a direction opposite to a direction in which the first wound part is wound. One end of the second wound part is a free end, and another end of the second wound part is connected to at least one of the first movable member, the first center shaft, and the first wound part. The second wound part is twisted with initial elastic energy ie2 applied to the second wound part as measured without any force transmitted from outside the power generation mechanism. An absolute value of the initial elastic energy ie2 is set to be equal to an absolute value of the initial elastic energy ie1. The second movable member is turnable by a predetermined amount by a force transmitted to the second movable member from outside the power generation mechanism through the second center shaft, bringing the first tooth of the first movable member and the second tooth of the second movable member into engagement with each other to make the first movable member and the second movable member movable together so that the first movable member is turned by the predetermined amount. Upon turning of the first movable member by the predetermined amount, the free end of the first wound part contacts the housing and is prevented from moving, making the first wound part twisted with elastic energy ie12 accumulating on the first wound part. After the first movable member has been turned by the predetermined amount, the first tooth of the first movable member and the second tooth of the second movable member are disengaged from each other, and the first movable member is turned in an opposite direction by the predetermined amount by the elastic energy ie12, causing the first center shaft to turn so that turning of the first center shaft is transmitted to a shaft of the power generator, causing the shaft of the power generator to turn so that the power generator generates power. Upon turning of the first center shaft, the free end of the second wound part contacts the housing and is prevented from moving, causing the initial elastic energy ie1 and the initial elastic energy ie2 to turn the first center shaft.

Another embodiment of the present invention is a method for generating power using a power generation mechanism that generates power by a switching operation without using a power source. The power generation mechanism includes a first movable member, a second movable member, a twisted coil spring, a power generator, and a housing. The first movable member includes a gear including a transmission core and a tooth formed on a part of the transmission core, and is supported rotatably about a first center shaft. The second movable member includes a gear including a transmission core and a tooth formed on a part of the transmission core, and is supported rotatably about a second center shaft. The twisted coil spring includes a first wound part and a second wound part. The first wound part is wound around the first center shaft. One end of the first wound part is a free end, and another end of the first wound part is connected to at least one of the first movable member, the first center shaft, and the second wound part. The first wound part is twisted with initial elastic energy ie1 applied to the first wound part as measured without any force transmitted from outside the power generation mechanism. The second wound part is wound around the first center shaft in a direction opposite to a direction in which the first wound part is wound. One end of the second wound part is a free end, and another end of the second wound part is connected to at least one of the first movable member, the first center shaft, and the first wound part. The second wound part is twisted with initial elastic energy ie2 applied to the second wound part as measured without any force transmitted from outside the power generation mechanism. An absolute value of the initial elastic energy ie2 is set to be equal to an absolute value of the initial elastic energy ie1. The method includes: turning the second movable member by a predetermined amount by applying a force to the second movable member from outside the power generation mechanism through the second center shaft so as to bring the first tooth of the first movable member and the second tooth of the second movable member into engagement with each other, making the first movable member and the second movable member move together to turn the first movable member by the predetermined amount; by thus turning the first movable member by the predetermined amount, making the free end of the first wound part contact the housing and be prevented from moving so as to make the first wound part twisted with elastic energy ie12 accumulating on the first wound part; after the first movable member has been turned by the predetermined amount, disengaging the first tooth of the first movable member and the second tooth of the second movable member from each other, and turning the first movable member in an opposite direction by the predetermined amount using the elastic energy ie12 so as to cause the first center shaft to turn so that turning of the first center shaft is transmitted to a shaft of the power generator, causing the shaft of the power generator to turn so that the power generator generates power; by thus turning the first center shaft, making the free end of the second wound part contact the housing and be prevented from moving so as to cause the initial elastic energy ie1 and the initial elastic energy ie2 to turn the first center shaft.

As used herein, the term "predetermined amount" refers to a turning angle by which the first movable member or the second movable member is turned. It is to be noted that the predetermined amount may not necessarily be the same on all occasions; the predetermined amount may vary depending on the turning direction in which the first movable member or the second movable member is turned, and the turning angle may vary depending on the dimensions of the first movable member or the second movable member.

The above-described power generation mechanism and the above-described method for generating power may be used in lighting devices and in notification devices for vehicle purposes.

Figure 3:
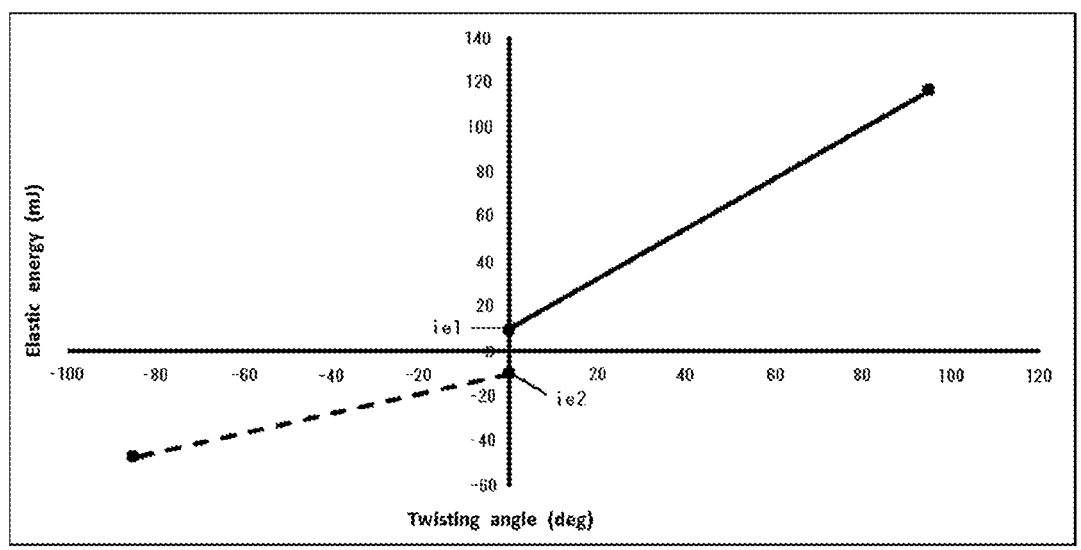
FIG. 3 is a graph showing inclinations of spring constants of the first wound part and the second wound part of the twisted coil spring illustrated in FIG. 1, and showing levels of initial elastic energy ie1 and initial elastic energy ie2, which are respectively applied to the first wound part and the second wound part, with the solid line associated with the first wound part and the dotted line associated with the second wound part.

It is to be noted that in the embodiments of the present invention, torque (N·mm) applied to and/or accumulating on the spring, the first twisted coil spring (first wound part), and the second twisted coil spring (second wound part) will be denoted as "elastic energy" (mJ). Accordingly, the vertical axis of the graph illustrated in FIG. 3 is denoted as "Elastic energy (mJ)", instead of as "Torque (N·mm)".

The embodiments of the present invention will be described below. It is to be noted that the present invention will not be limited to the following embodiments.

EMBODIMENTS

Figure 2:
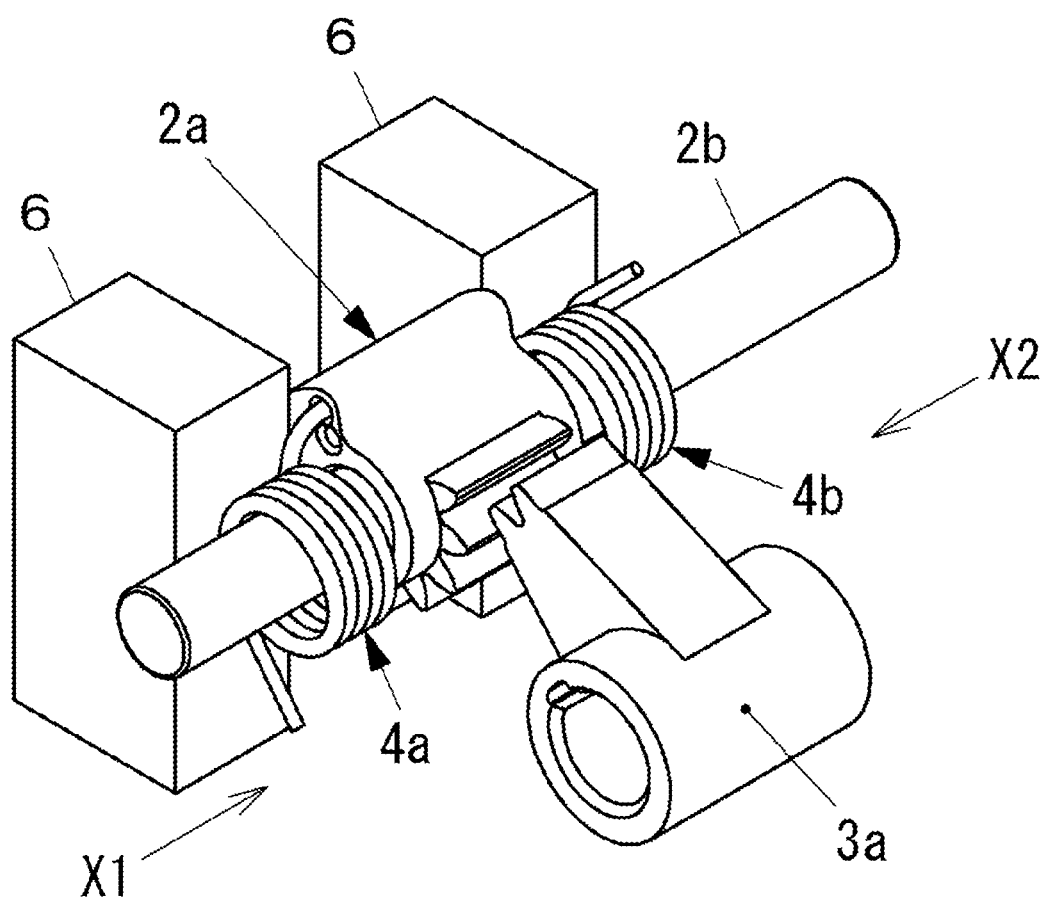
FIG. 2 is a perspective view of components selected from the power generation mechanism illustrated in FIG. 1, namely, a first movable member, a first center shaft, a twisted coil spring, a second movable member, and a housing.

By referring to FIGS. 1 to 9, description will be made with regard to a power generation mechanism 1 according to an embodiment of the present invention, and with regard to a method according to another embodiment for generating power performed by the power generation mechanism 1. As illustrated in FIGS. 1 and 2, the power generation mechanism 1 includes a first movable member 2a, a second movable member 3a, a twisted coil spring 4, a power generator 5, and a housing 6. At least the first movable member 2a, the second movable member 3a, the twisted coil spring 4, and the power generator 5 are incorporated in the housing 6. Also, another end of a second center shaft 3b (that is, the end opposite to one end of the second center shaft 3b at which the second movable member 3a is axially supported) passes through a hole disposed in the housing 6 and protrudes to outside the housing 6.

The first movable member 2a is a gear that includes a cam-shaped transmission core and a plurality of teeth formed on a part of the outer surface of the transmission core. The first movable member 2a is supported by a first center shaft 2b turnably about the first center shaft 2b. The first center shaft 2b is fixed at both ends in the housing 6.

Also, the second movable member 3a is a gear that includes a cam-shaped transmission core and a plurality of teeth formed on a part of the outer surface of the transmission core. The second movable member 3a is supported by the second center shaft 3b turnably about the second center shaft 3b.

In this embodiment, the teeth of the first movable member 2a and the teeth of the second movable member 3a are involute teeth. Employing involute teeth is preferred in that the gears are kept in proper engagement even if slight changes occur to the center distance between the gears (the linear distance between the center of the first center shaft 2b and the center of the second center shaft 3b), and in that involute teeth are more easily prepared and less slippery. It is to be noted that the teeth of 2a or 3a may be cycloid teeth, instead of involute teeth.

The twisted coil spring 4 is a spring that includes at least two wound parts, namely, a first wound part and a second wound part. In the power generation mechanism 1, the first wound part and the second wound part are formed independently on the respective two twisted coil springs (the first twisted coil spring 4a and the second twisted coil spring 4b).

Figure 4A:
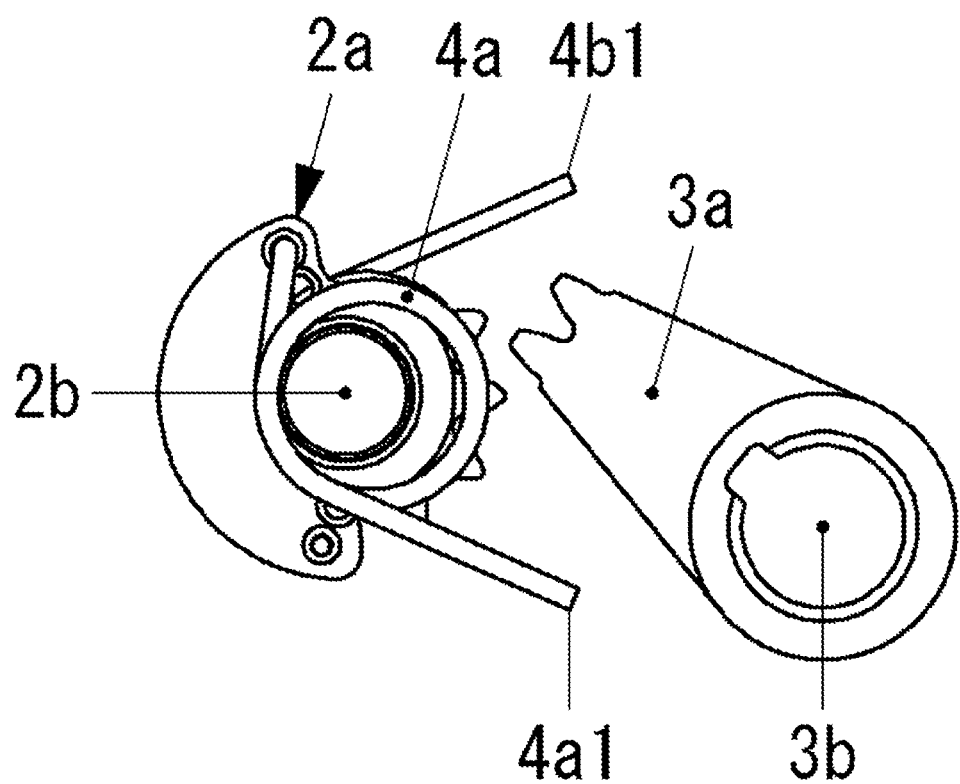
FIG. 4A is a schematic illustrating components selected from the power generation mechanism illustrated in FIG. 1, namely, the first movable member, a first center shaft, the twisted coil spring, the second movable member, and a second center shaft, illustrating initial states of the components as viewed from X1 direction illustrated in FIG. 2.
Figure 4B:
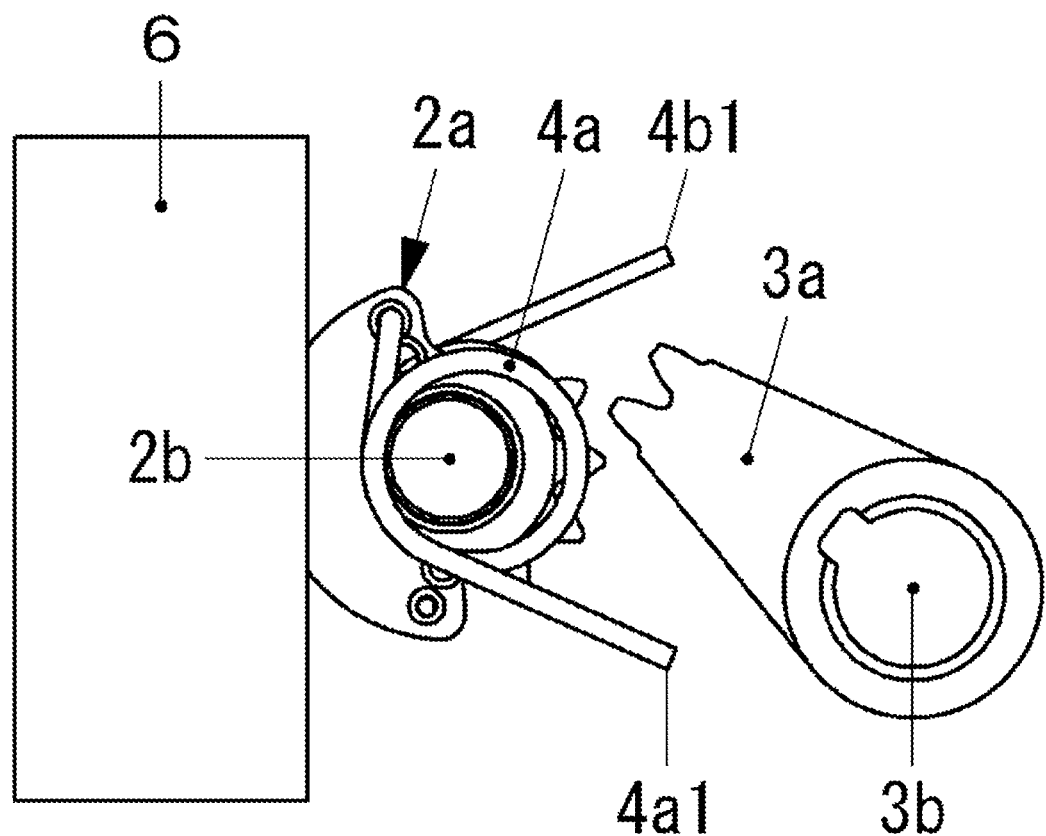
FIG. 4B is a schematic illustrating a state in which the housing is combined with the components illustrated in FIG. 4A.

As illustrated in FIGS. 4A and 4B, the wound part (the first wound part) of the first twisted coil spring 4a is wound around the first center shaft 2b. One end of the first wound part is a free end 4a1. Another end of the first wound part is connected to at least one of the first movable member 2a, the first center shaft 2b, and the second wound part. In the power generation mechanism 1 according to this embodiment, the another end of the first wound part is connected to the first movable member 2a.

The twisting of the first wound part causes initial elastic energy ie1 (mJ) to be applied to the first wound part (that is, the first twisted coil spring 4a) as measured without any force transmitted from outside the power generation mechanism.

Figure 7:
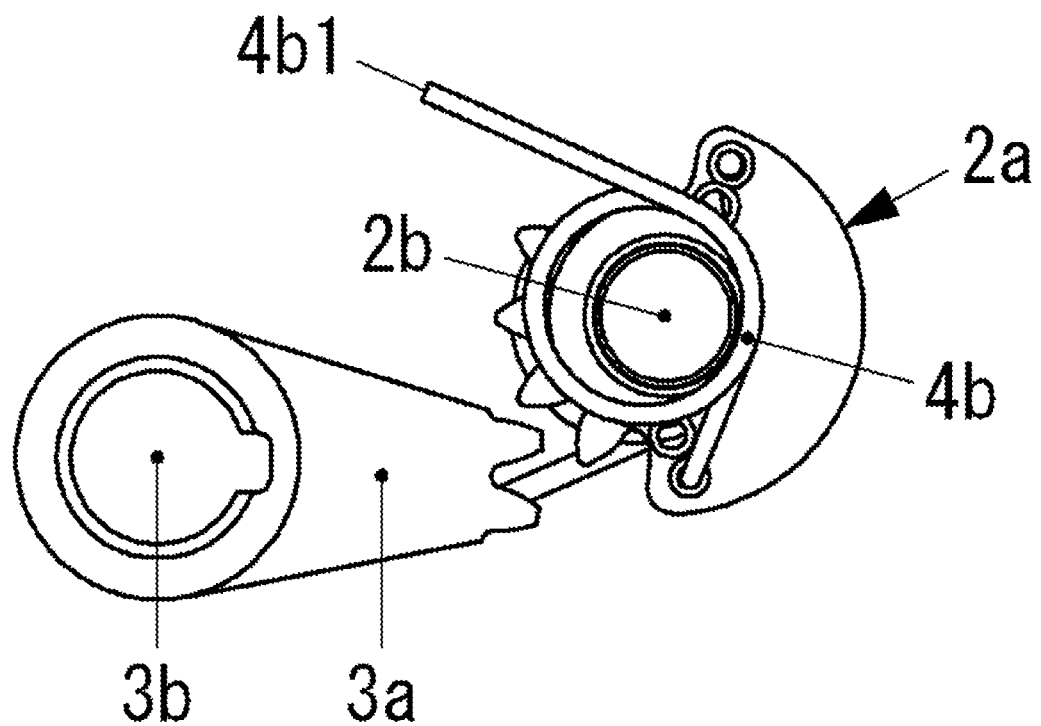
FIG. 7 is a schematic illustrating the state illustrated in FIG. 6A as viewed from X2 direction illustrated in FIG. 2.

As illustrated in FIG. 7, the wound part (the second wound part) of the second twisted coil spring 4b is wound around the first center shaft 2b in the direction opposite to the direction in which the first wound part is wound. One end of the second wound part is a free end 4b1. Another end of the second wound part is connected to at least one of the first movable member 2a, the first center shaft 2b, and the first wound part. In the power generation mechanism 1 according to this embodiment, the another end of the second wound part is connected to the first movable member 2a.

The twisting of the second wound part causes initial elastic energy ie2 (mJ) to be applied to the second wound part (that is, the second twisted coil spring 4b) as measured without any force transmitted from outside the power generation mechanism.

As shown in the graph of FIG. 3, the absolute value of ie2 and the absolute value of ie1 are equal to each other. Further, as seen from the difference in inclination in the graph between the first wound part and the second wound part, the spring constant K1 of the first wound part and the spring constant K2 of the second wound part are in a large-small relationship of K1>K2.

It is to be noted that while in the power generation mechanism 1 the another ends of the first wound part and the second wound part are connected to the first movable member 2a, the another ends may be connected to each other, so that a single twisted coil spring that includes the first wound part and the second wound part is used in place of the twisted coil spring 4.

An axial direction of the first center shaft 2b and an axial direction of a shaft 5a of the power generator 5 are parallel to each other. A spur gear 7 is axially supported by a part of the first center shaft 2b disposed at a distance from the part axially supporting the first movable member 2a. The first center shaft 2b and the shaft 5a of the power generator 5 are connected to each other via the single spur gear 7. It is to be noted that FIG. 1 omits illustration of the teeth of the first movable member 2a, the second movable member 3a, the shaft 5a ends, and the spur gear 7.

The power generator 5 is a motor that includes at least a coil and a magnet. This motor is of the type that either the coil or the magnet rotates together with rotation of the shaft 5a.

The housing 6 has a quadrangular shape on the outside and a bus-tab shape on the inside so that a plurality of partition plates 6a, which fix the power generator 5, and side wall parts are disposed in the housing 6. It is to be noted that the housing 6 may be a single integral part, or this may be replaced with an assembly structure made up of a number of parts such as side wall parts and a bottom part.

Materials for the first movable member 2a, the second movable member 3a, the spur gear 7, and the housing 6 may be selected conveniently, examples including plastic, resin capable of sliding contact without lubrication, stainless, and steel.

Next, description will be made with regard to a principle of operation that the power generation mechanism 1 makes to perform self-powering. For example, the second center shaft 3b is attached with a switch part, not illustrated. When the switch part is pressed by a force from outside the power generation mechanism, the second center shaft 3b is turned. The force may be a manual pressing force or a pressing force from a powered object that can vary from application to application.

When the second center shaft 3b is turned, the force of the turning is transmitted from outside the power generation mechanism 1 to the second movable member 3a through the second center shaft 3b, causing the second movable member 3a to turn and move by a predetermined amount (which is, in FIGS. 4A, 4B, 5A, and 5B, approximately 35° to 45° in the anti-clockwise direction). Thus, the second movable member 3a functions as a switch part in the power generation mechanism 1 and is movable by a switching operation.

At a previous step before the turning of the second movable member 3a is transmitted to the first movable member 2a, the first movable member 2a is kept at a position where ie2 and ie1 are in balance, as shown in the graph of FIG. 3. When the second movable member 3a is turned, the teeth of the first movable member 2a and the teeth of the second movable member 3a are brought into engagement with each other, causing the first movable member 2a and the second movable member 3a to start moving together.

The first movable member 2a continues turning while the force is continuously transmitted to the second movable member 3a, keeping the teeth of the first movable member 2a and the teeth of the second movable member 3a in engagement. Thus, the first movable member 2a is turned by the predetermined amount until the teeth of the first movable member 2a are disengaged from the teeth of the second movable member 3a (in this embodiment, the predetermined amount is, in FIGS. 4A, 4B, 5A, and 5B, approximately 70° to 80° in the clockwise direction).

Upon turning of the first movable member 2a by the predetermined amount, the first center shaft 2b and the first wound part are turned by the predetermined amount, together with the turning of the first movable member 2a. This turning causes the free end 4a1 of the first wound part to move; the turning of the first movable member 2a by the predetermined amount causes the free end 4a1 of the first wound part to contact a side surface of the housing 6 and be prevented from moving. The another end of the first wound part, which is connected to the first movable member 2a, is turned together with the turning of the first movable member 2a by the predetermined amount. Thus, the first wound part starts being twisted upon stopping of the movement of the free end 4a1. This twisting of the first wound part, which is involved with the engagement between the teeth of the first movable member 2a and the second movable member 3a, causes the elastic energy ie12 (mJ) to accumulate on the first wound part.

The twisting of the first wound part is maintained while the force is continuously transmitted to the second movable member 3a, keeping the teeth of the first movable member 2a and the teeth of the second movable member 3a in engagement. Therefore, the elastic energy ie12 on the first wound part is at its maximum at the time immediately before the teeth of the first movable member 2a are disengaged from the teeth of the second movable member 3a. In this embodiment, the elastic energy ie12 is at its maximum at the time when the first movable member 2a and the first center shaft 2b have been turned approximately 70° to 80°.

Figure 5A:
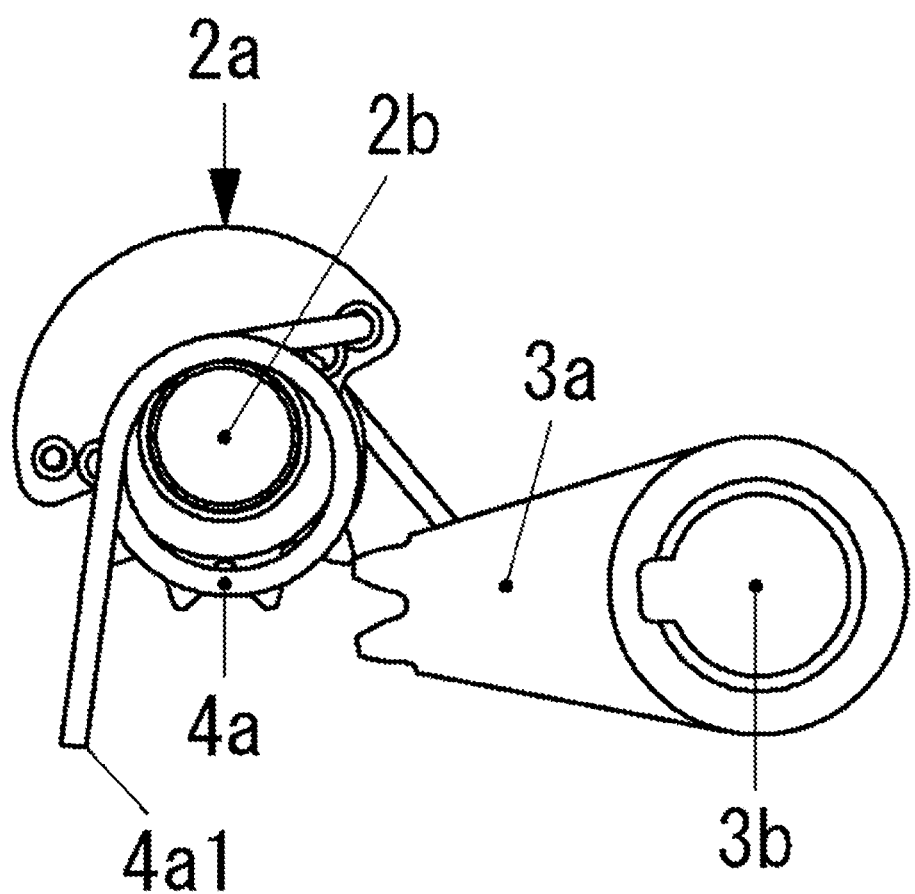
FIG. 5A is a schematic illustrating a state in which the second movable member and the first movable member have been turned from the respective positions illustrated in FIGS. 4A and 4B.
Figure 5B:
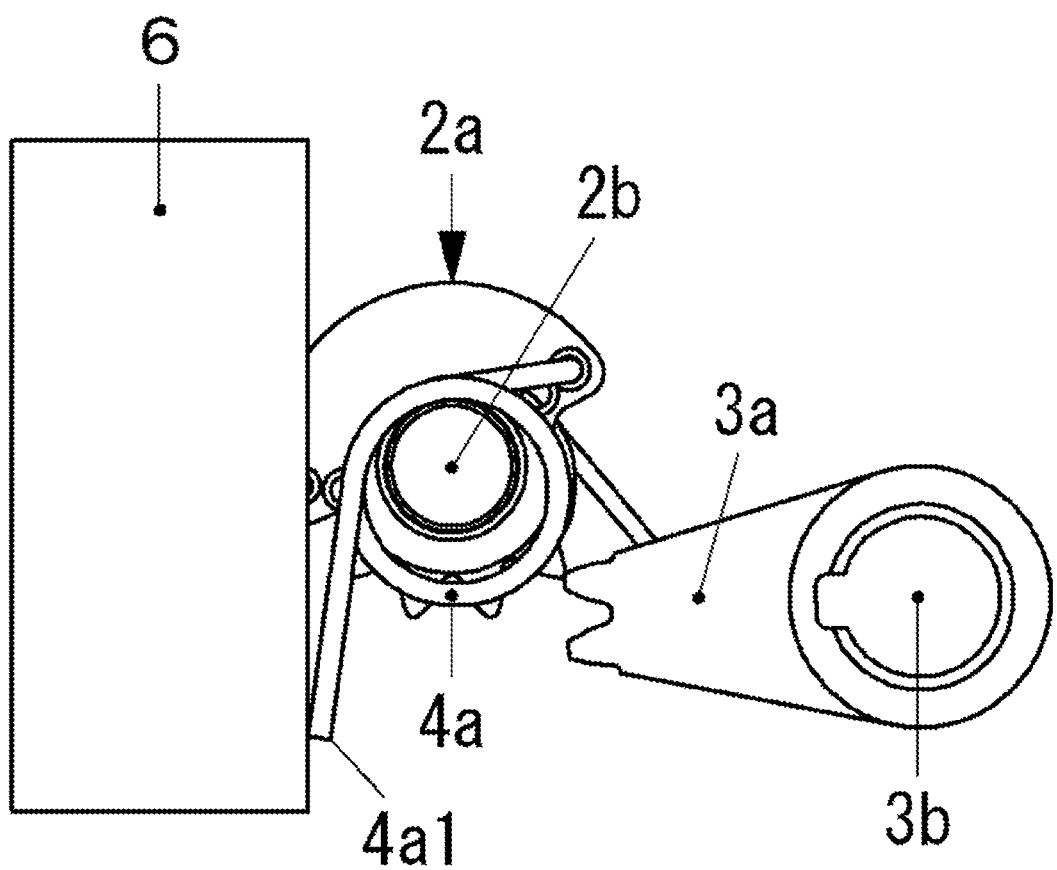
FIG. 5B is a schematic illustrating a state in which the housing is combined with the components illustrated in FIGS. 5A and 5B.
Figure 6A:
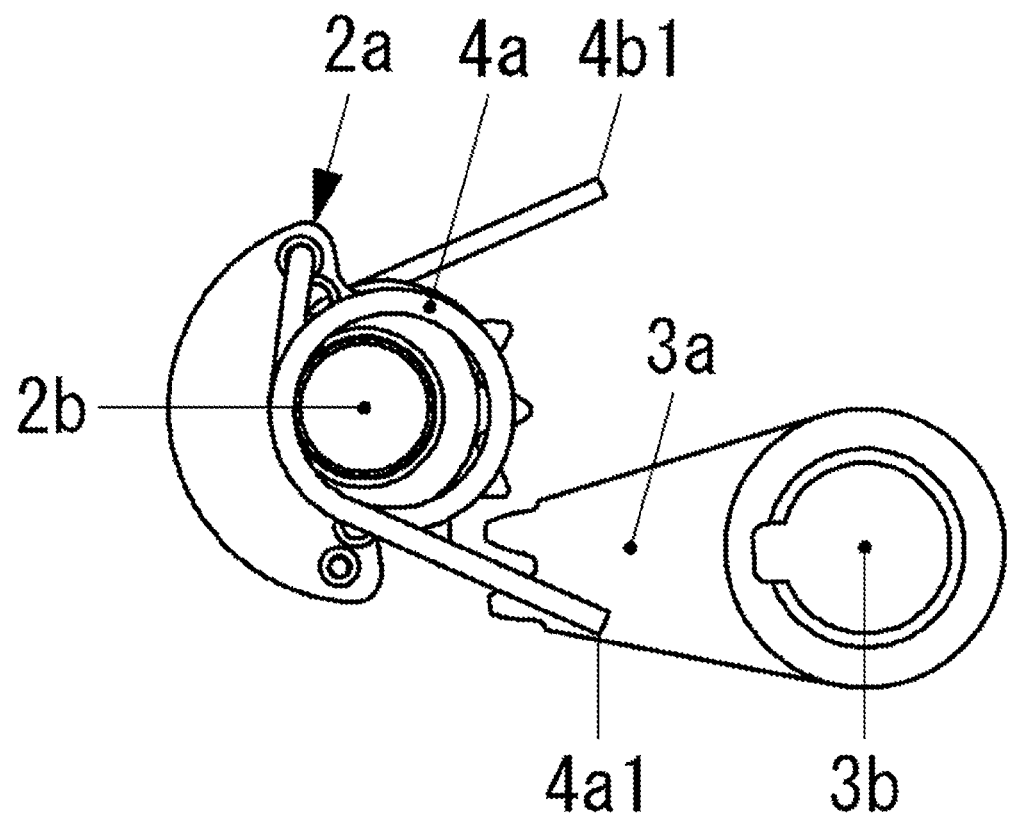
FIG. 6A is a schematic illustrating a state in which the first movable member has been turned in the opposite direction from the position illustrated in FIGS. 5A and 5B by the elastic energy ie12.
Figure 6B:
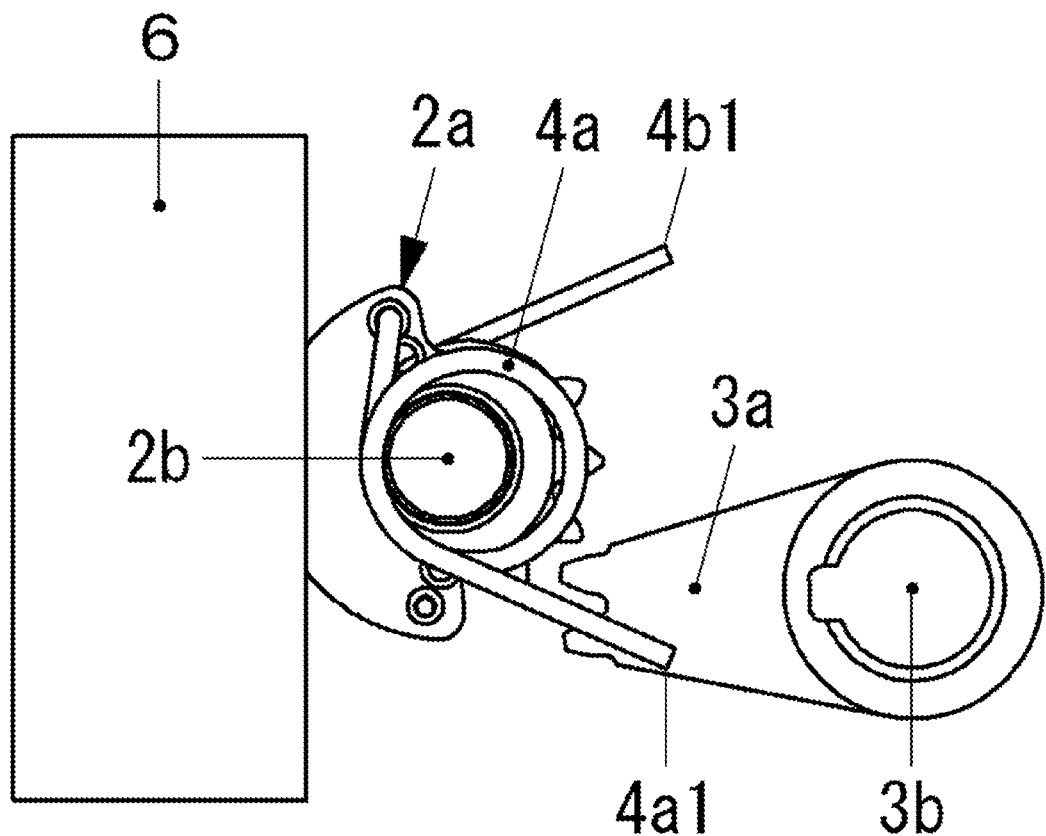
FIG. 6B is a schematic illustrating a state in which the housing is combined with the components illustrated in FIG. 6A.

After the first movable member 2a has been turned by the predetermined amount, the teeth of the first movable member 2a are disengaged from the teeth of the second movable member 3a, as illustrated in FIGS. 5A and 5B. This releases the deforming manner in which the first wound part has been held by the twisting, releasing the first wound part out of the deformed form. This causes ie12 to turn the first movable member 2a in the opposite direction by the predetermined amount on a fulcrum performed by the free end 4a1 of the first wound part contacting and stopped by the side surface of the housing 6. In this embodiment, the first movable member 2a is turned in the anti-clockwise direction by approximately 70° to 80° (see FIGS. 5A, 5B, 6A, and 6B). That is, ie12 is converted into the turning of the first movable member 2a in the opposite direction by the predetermined amount.

Upon turning of the first movable member 2a in the opposite direction by the predetermined amount, the first center shaft 2b is turned in the opposite direction by the predetermined amount, together with the first movable member 2a. At the same time, the spur gear 7 is turned, together with the first center shaft 2b, causing the shaft 5a to turn by the predetermined amount at a uniform speed. The turning of the shaft 5a by the predetermined amount and at the uniform speed causes the power generator 5 to generate power in the power generator 5. Thus, power is generated. The generated power can be used to activate an infrared communication device or another wireless communication device that may be optionally installed and that may vary depending on the application in which the power generation mechanism 1 is used.

The amount and speed of turning of the shaft 5a vary depending on the amount by which the first movable member 2a is turned in the opposite direction, that is, depending on the maximum of ie12. It is, therefore, possible to set ie12 at any predetermined amount based on the arc length of the pitch circle over which the teeth of the first movable member 2a are engaged with the teeth of the second movable member 3a. Since the amount by which the shaft 5a is turned can be set at any predetermined amount, the amount of power generation by the power generator 5 can be set at a constant value, irrespective of the speed of the external force transmitted to the second movable member 3a.

Thus, the twisted coil spring 4 is used in the power generation mechanism 1 and the method for generating power performed by the power generation mechanism 1. By twisting the twisted coil spring 4, ie12 accumulates on the first wound part. By releasing ie12, the power generator 5 generates power. This enables the power generation mechanism 1 to generate a constant amount of power, no matter how low the speed of force application is when the second movable member 3a is turned by a force to put the power generation mechanism 1 into operation. Thus, a reliable switching operation is ensured.

Further, gears are used as components of the power generation mechanism 1. Use of gears ensures that an engagement between the teeth of the first movable member 2a and the second movable member 3a is used to operate the power generation mechanism 1. This configuration is preferred in that an occurrence of operation loss is eliminated or minimized, enabling the power generation mechanism 1 to generate a constant amount of power, regardless of the application and/or situation in which the power generation mechanism 1 is used. Thus, a reliable switching operation is ensured.

Further, the power generation mechanism 1 is made up of simple components such as gears (the first movable member 2a and the second movable member 3a), the twisted coil spring 4, the power generator 5, and the housing 6. This makes the power generation mechanism 1 superior in anti-weatherability and reliability and capable of generating a constant amount of power, regardless of the application and/or situation in which the power generation mechanism 1 is used. Thus, the power generation mechanism 1 ensures a reliable switching operation.

Next, upon turning of the first center shaft 2b in the opposite direction, the free end 4b1 of the second wound part is turned, together with the turning of the first center shaft 2b, causing the free end 4b1 of the second wound part to contact the side surface of the housing 6 and be prevented from moving. Another end of second wound part, which is connected to the first movable member 2a, is turned together with the turning of the first movable member 2a in the opposite direction by the predetermined amount. Thus, the second wound part starts being twisted upon stopping of the movement of the free end 4b1; the elastic energy involved with the twisting starts accumulating on the second wound part.

In spite of the twisting of the second wound part, since the teeth of the first movable member 2a and the second movable member 3a are no longer in engagement at this point of time, the twisting of the second wound part is released immediately, instead of being maintained. Therefore, no elastic energy accumulates on the second wound part at this point of time. Meanwhile, the first center shaft 2b is turned by ie1 and ie2 alone on a fulcrum performed by the free end 4b1 of the second wound part contacting and stopped by the side surface of the housing 6. Specifically, the first center shaft 2b is turned to an angular position where ie1 and ie2 are in balance. Upon turning of the first center shaft 2b, the first movable member 2a is returned to its initial state (which is the state before the engagement between the teeth of the first movable member 2a and the second movable member 3a).

Further, the spring constant K1 of the first wound part and the spring constant K2 of the second wound part are in a large-small relationship of K1>K2. This prevents elastic energy equal to or more than ie12 from accumulating on the second wound part when the first movable member 2a is returned to its initial state by the turning of the first center shaft 2b (the initial state is the state before the engagement between the teeth of the first movable member 2a and the second movable member 3a). This prevents damage to the second wound part caused by an excessive amount of elastic energy accumulating on the second wound part, and prevents the power generator 5 from generating power unnecessarily. These effects, combined with the above-described effects, enable the power generation mechanism 1 to perform a switching operation even more reliably, and provide the power generation mechanism 1 with improved durability and reliability.

Further, the components of the power generation mechanism 1 (the first movable member 2a, the second movable member 3a, the twisted coil spring 4, and the power generator 5) are incorporated in the housing 6. This configuration, combined with the above-described effects, ensures dust resistant property, waterproof property, and/or other properties at various parts of the power generation mechanism 1, such as a transmission part between the first movable member 2a and the second movable member 3a. In addition, an effect of preventing rust at the gears is obtained. As a result, the power generation mechanism 1 further improves in anti-weatherability and reliability, capable of performing a more reliable switching operation.

Further, the axial direction of the first center shaft 2b and the axial direction of the shaft 5a of the power generator 5 are parallel to each other, and the first center shaft 2b and shaft 5a are connected to each other via the spur gear 7. These configurations, combined with the above-described effects, eliminate the need for using an axial conversion member such as a bevel gear. As a result, a wider margin of tolerance is allowed for the power generation mechanism 1, increasing the yield rate of the power generation mechanism 1 and improving the reliability of the power generating operation.

Next, upon release of the force that has been input from outside the power generation mechanism 1, such as a manual pressing force or a pressing force from a powered object that can vary from application to application, a spring disposed in the switch part applies elastic energy ied (mJ) to the second movable member 3a. The elastic energy ied (mJ) causes the second movable member 3a to turn in the opposite direction by the predetermined amount (the predetermined amount is, in FIGS. 8A and 8B, approximately 35° to 45° in the clockwise direction), moving from the position illustrated in FIG. 7 to the position illustrated in FIGS. 8A, 8B, and 9. The state in which transmission of the force to the switch part is released depends on the application in which the power generation mechanism 1 is used. Examples include a state in which a user has stopped pressing the switch part, and a state in which the pressing force from the powered object has stopped because the powered object has been removed or has vanished.

Upon turning of the second movable member 3a in the opposite direction by the predetermined amount, the teeth of the first movable member 2a is engaged with the teeth of the second movable member 3a again so that the first movable member 2a and the second movable member 3a move together, causing the first movable member 2a to turn in the opposite direction by the predetermined amount. (In this embodiment, the predetermined amount is approximately 70° to 80° in the anti-clockwise direction. See FIGS. 6A, 6B, 8A, and 8B.) The amount by which the first movable member 2a is turned in the opposite direction depends on the amount by which the second movable member 3a is turned in the opposite direction by the predetermined amount.

Upon turning of the first movable member 2a in the opposite direction by the predetermined amount, the first center shaft 2b and the second wound part are turned by the predetermined amount, together with the turning of the first movable member 2a. This turning causes the free end 4b1 of the second wound part to move; the turning of the first movable member 2a by the predetermined amount causes the free end 4b1 of the second wound part to contact a side surface of the housing 6 and be prevented from moving. The another end of the second wound part, which is connected to the first movable member 2a, is turned together with the turning of the first movable member 2a by the predetermined amount. Thus, the second wound part starts being twisted upon stopping of the movement of the free end 4b1. This twisting of the second wound part, which is involved with the engagement between the teeth of the first movable member 2a and the second movable member 3a, causes elastic energy ie22 (mJ) to accumulate on the second wound part.

The twisting of the second wound part is maintained while the elastic energy ied is continuously transmitted to the second movable member 3a from the spring, keeping the teeth of the first movable member 2a and the teeth of the second movable member 3a in engagement. Therefore, the elastic energy ie22 on the second wound part is at its maximum at the time immediately before the teeth of the first movable member 2a are disengaged from the teeth of the second movable member 3a. In this embodiment, the elastic energy ie22 is at its maximum at the time when the first movable member 2a and the first center shaft 2b have been turned approximately 70° to 80°.

Figure 8A:
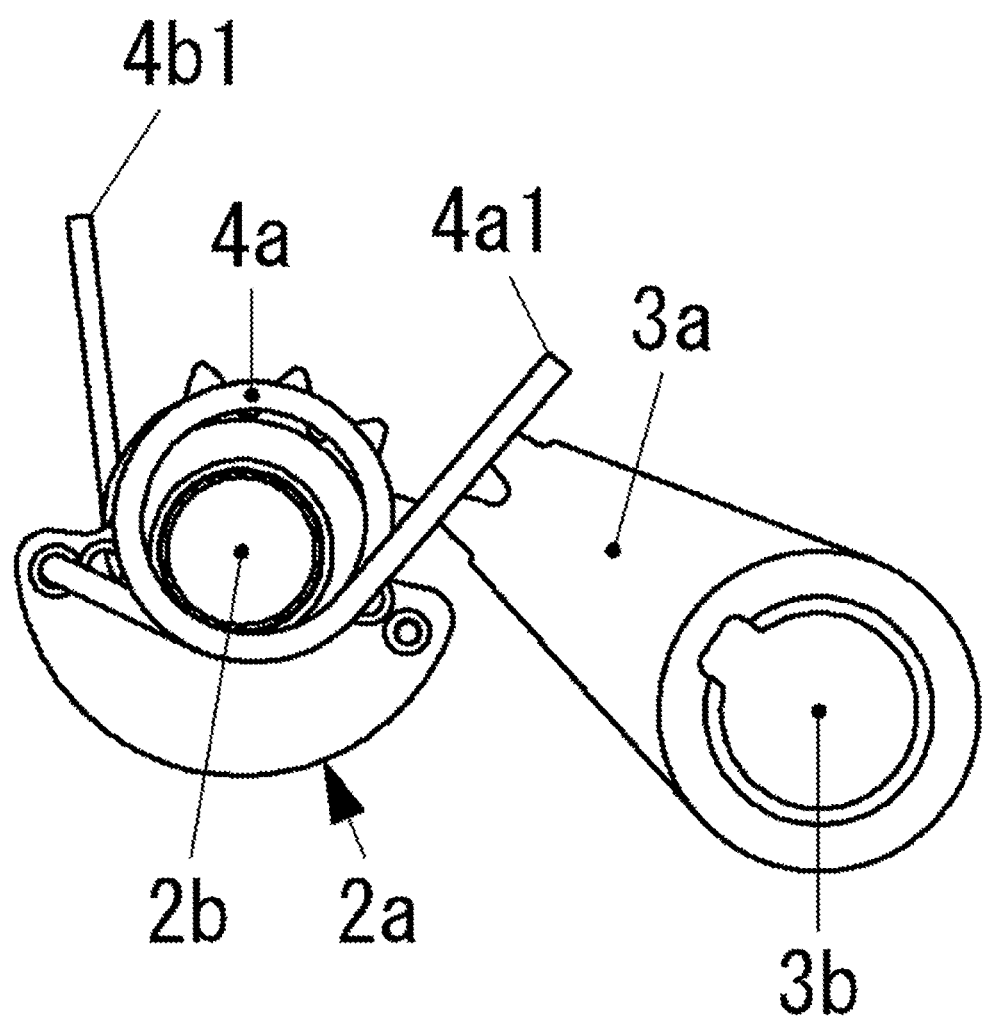
FIG. 8A is a schematic illustrating a state in which the second movable member and the first movable member have been turned in the opposite direction from the positions illustrated in FIGS. 6A and 6B.
Figure 8B:
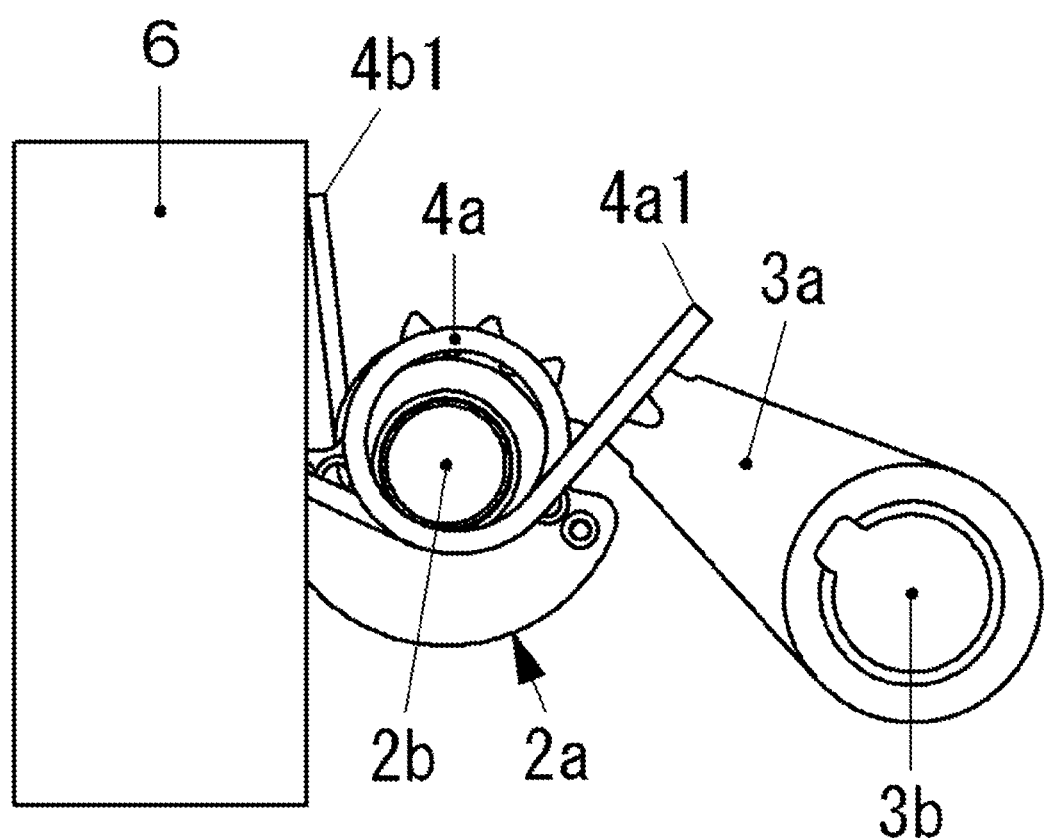
FIG. 8B is a schematic illustrating a state in which the housing is combined with the components illustrated in FIG. 8A.
Figure 9:
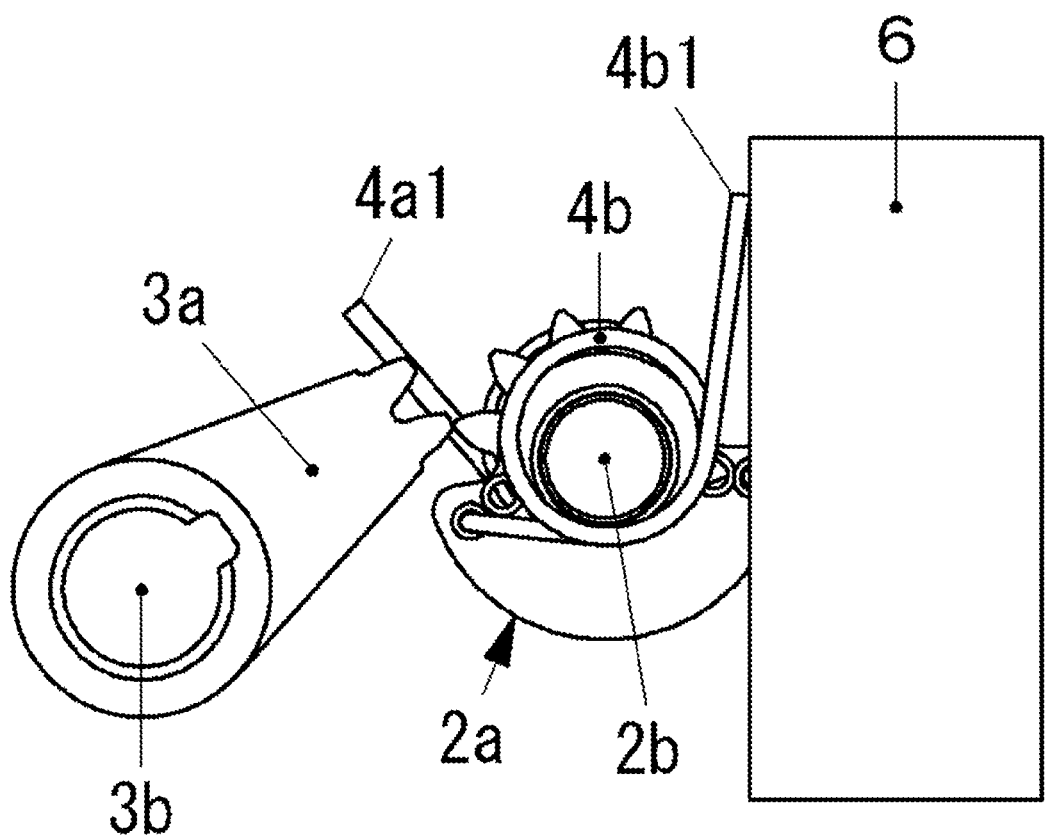
FIG. 9 is a schematic illustrating the state illustrated in FIG. 8A as viewed from the X2 direction illustrated in FIG. 2.

After the first movable member 2a has been turned in the opposite direction by the predetermined amount, the teeth of the first movable member 2a are disengaged from the teeth of the second movable member 3a, as illustrated in FIGS. 8A, 8B, and 9. This releases the deforming manner in which the second wound part has been held by the twisting, releasing the second wound part out of the deformed form. This causes ie22 to turn the first center shaft 2b in the opposite direction by the predetermined amount on a fulcrum performed by the free end 4b1 of the second wound part contacting and stopped by the side surface of the housing 6. (In this embodiment, the first center shaft 2b is turned in the clockwise direction by approximately 70° to 80°. See FIGS. 8A, 8B, 4A, and 4B.) That is, ie22 is converted into the turning of the first center shaft 2b by the predetermined amount.

Upon turning of the first center shaft 2*b* by the predetermined amount, the spur gear 7, which is connected to the first center shaft 2*b*, is turned by the predetermined amount, causing the shaft 5*a* to turn by the predetermined amount at a uniform speed.

In this regard, assume that the desirable voltage (counter electromotive force) [V] to be generated by the power generator 5 is A [V], and that elastic energy of equal to or more than ie12 is necessary for obtaining the required rotational speeds of the shaft 5*a* and the first center shaft 2*b* for A [V] to occur. Even in this case, the inclination of the spring constant of the second wound part is set to be more gradual than the inclination of the spring constant of the first wound part (that is, K1>K2), as seen in the graph shown in FIG. 3. This ensures that the elastic energy accumulating on the second wound part is kept below ie12 by twisting the second wound part at a twisting angle identical to the twisting angle of the first wound part. As a result, the power generator 5 is prevented from performing a power generating operation unnecessarily.

Upon turning of the first center shaft 2*b* by the predetermined amount, the free end 4*a*1 of the first wound part contacts the side surface of the housing 6 again and is prevented from moving. The another end of the first wound part, which is connected to the first center shaft 2*b*, is turned together with the turning of the first center shaft 2*b* by the predetermined amount. Thus, the first wound part starts being twisted upon stopping of the movement of the free end 4*a*1. The twisting of the first wound part causes elastic energy to accumulate on the first wound part.

In spite of the twisting of the first wound part, since the teeth of the first movable member 2*a* and the second movable member 3*a* are no longer in engagement at this point of time, the twisting of the first wound part is released immediately, instead of being maintained. Therefore, no elastic energy accumulates on the first wound part at this point of time. Meanwhile, the first center shaft 2*b* is turned by ie1 and ie2 alone on a fulcrum performed by the free end 4*a*1 of the first wound part contacting and stopped by the side surface of the housing 6. Specifically, the first center shaft 2*b* is turned to an angular position where ie1 and ie2 are in balance. Upon turning of the first center shaft 2*b*, the first movable member 2*a* is returned to its initial state (which is the state before the engagement between the teeth of the first movable member 2*a* and the second movable member 3*a*).

As described in this embodiment, the "predetermined amount" referred to in the context of the amount by which the first movable member 2*a* and the second movable member 3*a* are turned may not necessarily be the same on all occasions. As in this embodiment, the predetermined amount may vary depending on the turning direction in which each component is turned. Also, the turning angle may vary depending on the dimensions of the components (2*a* and 3*a*).

The power generator 5 will not be limited to a motor insofar as the power generator 5 is a device that at least includes a coil and a magnet and generates power.

It is to be noted that it is possible to use a one-way clutch (1-way clutch) in place of the gear of the first movable member 2*a* or the second movable member.

Obviously, numerous modifications and variations of the present invention are possible in light of the above teachings. It is therefore to be understood that within the scope of the appended claims, the present invention may be practiced otherwise than as specifically described herein.

What is claimed is:

1. A power generation mechanism comprising:
a first movable member supported by a first center shaft rotatably about the first center shaft, the first movable member comprising a first gear comprising:
  a first transmission core; and
  a first tooth formed on a part of the first transmission core;
a second movable member supported by a second center shaft rotatably about the second center shaft, the second movable member comprising a second gear comprising:
  a second transmission core; and
  a second tooth formed on a part of the second transmission core;
a twisted coil spring comprising:
  a first wound part wound around the first center shaft, one end of the first wound part comprising a free end, another end of the first wound part being connected to at least one of the first movable member, the first center shaft, and the second wound part, the first wound part being twisted with initial elastic energy ie1 applied to the first wound part as measured without any force transmitted from outside the power generation mechanism; and
  a second wound part wound around the first center shaft in a direction opposite to a direction in which the first wound part is wound, one end of the second wound part comprising a free end, another end of the second wound part being connected to at least one of the first movable member, the first center shaft, and the first wound part, the second wound part being twisted with initial elastic energy ie2 applied to the second wound part as measured without any force transmitted from outside the power generation mechanism, an absolute value of the initial elastic energy ie2 being equal to an absolute value of the initial elastic energy ie1;
a power generator; and
a housing,
wherein the second movable member is turnable by a predetermined amount by a force transmitted to the second movable member from outside the power generation mechanism through the second center shaft, bringing the first tooth of the first movable member and the second tooth of the second movable member into engagement with each other to make the first movable member and the second movable member movable together so that the first movable member is turned by the predetermined amount,
wherein upon turning of the first movable member by the predetermined amount, the free end of the first wound part contacts the housing and is prevented from moving, making the first wound part twisted with elastic energy ie12 accumulating on the first wound part,
wherein after the first movable member has been turned by the predetermined amount, the first tooth of the first movable member and the second tooth of the second movable member are disengaged from each other, and the first movable member is turned in an opposite direction by the predetermined amount by the elastic energy ie12, causing the first center shaft to turn so that turning of the first center shaft is transmitted to a shaft of the power generator, causing the shaft of the power generator to turn so that the power generator generates power, and wherein upon turning of the first center shaft, the free end of the second wound part contacts the housing and is prevented from moving, causing the initial elastic energy ie1 and the initial elastic energy ie2 to turn the first center shaft.

2. The power generation mechanism according to claim 1, wherein a spring constant K1 of the first wound part and a spring constant K2 of the second wound part are in a large-small relationship of K1>K2.

3. The power generation mechanism according to claim 1, wherein at least the first movable member, the second movable member, the twisted coil spring, and the power generator are incorporated in the housing.

4. The power generation mechanism according to claim 1,
wherein an axial direction of the first center shaft and an axial direction of the shaft of the power generator are parallel to each other, and
wherein the first center shaft and the shaft of the power generator are connected to each other via a spur gear.

5. A method for generating power using a power generation mechanism,
the power generation mechanism comprising:
a first movable member supported by a first center shaft rotatably about the first center shaft, the first movable member comprising a first gear comprising:
a first transmission core; and
a first tooth formed on a part of the first transmission core;
a second movable member supported by a second center shaft rotatably about the second center shaft, the second movable member comprising a second gear comprising:
a second transmission core; and
a second tooth formed on a part of the second transmission core;
a twisted coil spring comprising:
a first wound part wound around the first center shaft, one end of the first wound part comprising a free end, another end of the first wound part being connected to at least one of the first movable member, the first center shaft, and the second wound part, the first wound part being twisted with initial elastic energy ie1 applied to the first wound part as measured without any force transmitted from outside the power generation mechanism; and
a second wound part wound around the first center shaft in a direction opposite to a direction in which the first wound part is wound, one end of the second wound part comprising a free end, another end of the second wound part being connected to at least one of the first movable member, the first center shaft, and the first wound part, the second wound part being twisted with initial elastic energy ie2 applied to the second wound part as measured without any force transmitted from outside the power generation mechanism, an absolute value of the initial elastic energy ie2 being equal to an absolute value of the initial elastic energy ie1;
a power generator; and
a housing,
the method comprising:
turning the second movable member by a predetermined amount by applying a force to the second movable member from outside the power generation mechanism through the second center shaft so as to bring the first tooth of the first movable member and the second tooth of the second movable member into engagement with each other, making the first movable member and the second movable member move together to turn the first movable member by the predetermined amount,
by thus turning the first movable member by the predetermined amount, making the free end of the first wound part contact the housing and be prevented from moving so as to make the first wound part twisted with elastic energy ie12 accumulating on the first wound part,
after the first movable member has been turned by the predetermined amount, disengaging the first tooth of the first movable member and the second tooth of the second movable member from each other to cause the elastic energy ie12 to turn the first movable member in an opposite direction by the predetermined amount so as to cause the first center shaft to turn so that turning of the first center shaft is transmitted to a shaft of the power generator, causing the shaft of the power generator to turn so that the power generator generates power, and
by thus turning the first center shaft, making the free end of the second wound part contact the housing and be prevented from moving so as to cause the initial elastic energy ie1 and the initial elastic energy ie2 to turn the first center shaft.

6. The method for generating power according to claim 5, wherein a spring constant K1 of the first wound part and a spring constant K2 of the second wound part are in a large-small relationship of K1>K2.

7. The method for generating power according to claim 5, wherein at least the first movable member, the second movable member, the twisted coil spring, and the power generator are incorporated in the housing.

8. The method for generating power according to claim 5,
wherein an axial direction of the first center shaft and an axial direction of the shaft of the power generator are parallel to each other, and
wherein the first center shaft and the shaft of the power generator are connected to each other via a spur gear.

* * * * *